United States Patent
Bulumulla et al.

(10) Patent No.: US 9,652,962 B1
(45) Date of Patent: May 16, 2017

(54) SYSTEMS AND METHODS FOR SAFETY AND PROXIMITY SENSING IN INDUSTRIAL ENVIRONMENTS

(71) Applicant: General Electric Company, Schenectady, NY (US)

(72) Inventors: Selaka Bandara Bulumulla, Niskayuna, NY (US); Michael Joseph Dell'Anno, Niskayuna, NY (US); Danijel Maricic, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/977,036

(22) Filed: Dec. 21, 2015

(51) Int. Cl.
| | | |
|---|---|---|
| *G08B 1/08* | (2006.01) | |
| *G08B 21/02* | (2006.01) | |
| *H04W 4/00* | (2009.01) | |
| *H04L 29/12* | (2006.01) | |
| *G08B 5/36* | (2006.01) | |

(52) U.S. Cl.
CPC ............... *G08B 21/02* (2013.01); *G08B 5/36* (2013.01); *H04L 61/6022* (2013.01); *H04W 4/008* (2013.01)

(58) Field of Classification Search
CPC ......... G08B 21/02; G08B 5/36; H04W 4/008; H04L 61/6022
See application file for complete search history.

(56) References Cited

U.S. PATENT DOCUMENTS

| | | |
|---|---|---|
| 5,440,290 A | 8/1995 | McCullough et al. |
| 5,600,253 A | 2/1997 | Cohen et al. |
| 5,939,986 A | 8/1999 | Schiffbauer et al. |
| 6,810,353 B2 | 10/2004 | Schiffbauer |
| 7,420,471 B2 | 9/2008 | Frederick et al. |
| 8,442,801 B2 | 5/2013 | Gonla et al. |

(Continued)

FOREIGN PATENT DOCUMENTS

| | | |
|---|---|---|
| CN | 201690442 U | 12/2010 |
| CN | 202504280 U | 10/2012 |
| WO | 2014071451 A1 | 5/2014 |

OTHER PUBLICATIONS

W. H. Schiffbauer., "An Active Proximity Warning System for Surface and Underground Mining Applications", Ntnl Inst for Occuptnl Sfty and Health, Feb. 2001.

(Continued)

*Primary Examiner* — Erin File
(74) *Attorney, Agent, or Firm* — Fletcher Yoder, P.C.

(57) ABSTRACT

A system includes a first electronic device configured to attach to an industrial machine or one or more areas of an industrial facility. The first electronic device is configured to transmit a signal indicative of a potentially hazardous condition with respect to personnel of the industrial facility. The system also includes a second electronic device communicatively coupled to the first electronic device and configured to attach to a hardhat of the personnel of the industrial facility. The second electronic device is configured to receive the signal from the first electronic device, determine whether a parameter of the signal is above a threshold, and generate an alarm when the parameter of the signal is above the threshold. The alarm is configured to indicate the potentially hazardous condition to the personnel.

18 Claims, 3 Drawing Sheets

(56) References Cited

U.S. PATENT DOCUMENTS

| | | | |
|---|---|---|---|
| 2004/0117624 A1* | 6/2004 | Brandt | H04L 63/1408 713/166 |
| 2007/0194944 A1* | 8/2007 | Galera | F16P 3/14 340/686.6 |
| 2011/0158858 A1* | 6/2011 | Alves Ramalho Gomes | C01B 3/042 422/187 |
| 2012/0098654 A1 | 4/2012 | Ebert | |
| 2012/0224356 A1* | 9/2012 | Fischer | F21V 21/084 362/106 |
| 2012/0253583 A1 | 10/2012 | Herdle | |
| 2014/0148196 A1* | 5/2014 | Bassan-Eskenazi | G01S 11/02 455/456.1 |
| 2014/0188348 A1* | 7/2014 | Gautama | B60W 10/30 701/48 |
| 2014/0370917 A1* | 12/2014 | Buchheim | H04W 4/026 455/456.1 |
| 2015/0170498 A1* | 6/2015 | Beggs | B60Q 1/2673 340/686.6 |
| 2015/0362581 A1* | 12/2015 | Friedman | G01S 13/767 455/456.1 |
| 2016/0142868 A1* | 5/2016 | Kulkarni | H04W 4/008 455/456.5 |
| 2016/0174022 A1* | 6/2016 | Nhu | H04W 4/005 455/41.2 |
| 2016/0232758 A1* | 8/2016 | Fletcher | G08B 3/10 |

OTHER PUBLICATIONS

Xuhui Huang et al., "Underground miners localization system based on ZigBee and WebGIS", Geoinformatics, 2010 18th International Conference on, pp. 1-5, Conference Location : Beijing, Jun. 18-20, 2010.

* cited by examiner

SYSTEMS AND METHODS FOR SAFETY AND PROXIMITY SENSING IN INDUSTRIAL ENVIRONMENTS

BACKGROUND OF THE INVENTION

The subject matter disclosed herein relates generally to industrial safety and warning systems, and more particularly, to systems and methods for safety and proximity sensing in industrial environments.

Industrial facilities, such as mining and other similar industrial environments, may include various interrelated equipment and processes, and may thus include one or more potentially hazardous areas. For example, mining industrial environments may potentially include areas of high temperatures and pressures, gaseous areas, large and heavy machinery, moving machinery, and so forth. Furthermore, mining personnel (e.g., miners, engineers, field technicians, supervisors, contractors, etc.) may be employed to work in such mining industrial environments to excavate valuable natural resources (e.g., coal, oil shale, precious metals, and so forth). It may be useful to provide one or more safety and protection systems to protect personnel employed to work in mining and/or other industrial environments.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a first electronic device configured to attach to an industrial machine or one or more areas of an industrial facility. The first electronic device is configured to transmit a signal indicative of a potentially hazardous condition with respect to personnel of the industrial facility. The system also includes a second electronic device communicatively coupled to the first electronic device and configured to attach to a hardhat of the personnel of the industrial facility. The second electronic device is configured to receive the signal from the first electronic device, determine whether a parameter of the signal is above a threshold, and generate an alarm when the parameter of the signal is above the threshold. The alarm is configured to indicate the potentially hazardous condition to the personnel.

In a second embodiment, a non-transitory computer-readable medium includes code with instructions to cause a processor to receive a signal from a first electronic device. The signal includes an indication of a potentially hazardous condition with respect to personnel of an industrial facility. The code further includes instructions to cause the processor to determine whether a parameter of the signal is above a threshold, and to generate an alarm when the parameter of the signal is above the threshold. The alarm is configured to indicate the potentially hazardous condition to the personnel.

In a third embodiment, a system includes a hardhat. The hardhat includes a light emitting diode (LED) headlamp assembly. The LED headlamp assembly includes a processor configured to receive a first signal including advertising packets. The advertising packets include one or more unique identification codes configured to indicate a potentially hazardous condition with respect to personnel of an industrial facility. The processor is further configured to determine whether a signal strength indicator (RSSI) of the first signal is above a threshold value, and to generate an alarm when the RSSI of the signal is above the threshold value. The alarm is configured to indicate the potentially hazardous condition to the personnel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
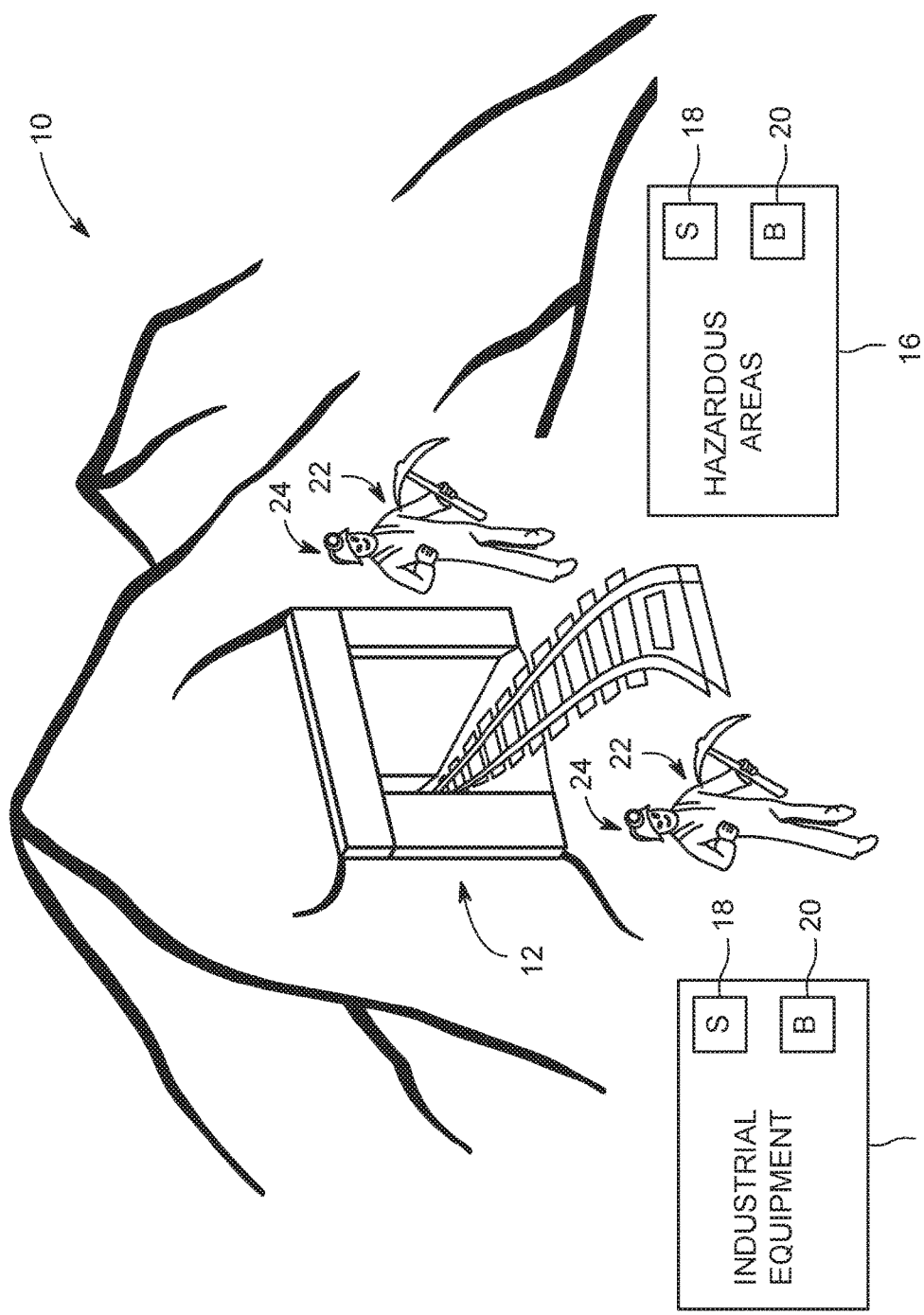
FIG. 1 is an example diagram of a mining industrial environment, in accordance with present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a scalable and configurable safety and proximity sensing system for safety and protection to personnel in mining environments and/or other industrial environments. The safety and proximity sensing system may be useful in providing a warning to mining personnel (e.g., miners, engineers, field technicians, supervisors, contractors, etc.) in the proximity of hazardous areas (e.g., potential areas of radiation, potentially hazardous gas, high and low temperatures and pressures, chemical emissions, oxygen depleted spaces, fire, smoke, thermal energy and radiation, rotational energy and vibration, corridors for high speed machinery movement, and so forth) and/or near industrial equipment (e.g., heavy-duty industrial equipment, remotely operated mining equipment, automatic mining machines, and so forth). In one embodiment, the safety and proximity sensing system may be integrated into equipment designed to be worn by the mining personnel.

For instance, the safety and proximity system may be integrated into an industrial hardhat. In some embodiments, the safety and proximity sensing system may be scalable (e.g., easy to increase the number of mining personnel and corresponding electronic hardhats worn by the mining personnel) and configurable (e.g., able to identify single or multiple hazardous areas at once, and able to add new hazardous areas over the course of operation as desired). In certain embodiments, the safety and proximity sensing system may warn the mining personnel via visual alarms (e.g., changing of the color of a light-emitting diode [LED] headlamp of an electronic hardhat), a vibration alarm, and/or haptic effect alarms. In other embodiments, the safety and proximity sensing system may generate signals to automatically trip (e.g., temporarily disable) potentially hazardous industrial equipment (e.g. automatic mining machine, conveyer belt of launch vehicle) when mining personnel enters into a designated hazardous area and/or nearby the potentially hazardous industrial equipment.

Furthermore, while the present embodiments may be generally directed toward safety and proximity sensing in mining industrial environments, it should be appreciated that the techniques described herein may be extended to any of various applications such as, for example, other industrial environments (e.g., power generation plants, chemical production plants, petroleum refineries, manufacturing facilities, building construction sites, and so forth) medical environments (e.g., hospitals, magnetic resonance imaging [MRI] labs), construction applications (e.g., new building construction, building repairs), and other similar industrial and/or commercial applications.

With the foregoing mind, it may be useful to describe an embodiment of a mining facility 10, as depicted in FIG. 1. As illustrated, the mining facility 10 may include a mine 12. The mine 12 may be a coal mine, metals mine, an oil shale mine, a gemstones mine, a limestone mine, a rock salt mine, a gravel mine, a clay mine, or other natural resources that may be mined. As further depicted in FIG. 1, the mining facility 10 may include industrial equipment 14 and one or more hazardous areas 16 within or external to the mine 12. For example, the industrial equipment 14 may include an automatic mining machine, a launch vehicle (e.g., and conveyor belt of the launch vehicle), one or more storage vessels (e.g., storage tanks), turbine systems (e.g., steam turbines, gas turbines, hydroelectric turbines, wind turbines), generators, expanders, pumps, compressors, valves, electrical systems, chemical reactors, gasifiers, gas treatment systems (e.g., acid gas removal systems) air separation units (ASUs), boilers, furnaces, water treatment systems, heat recovery steam generator (HRSG) systems, vats, conveyor belt systems, conduits, milling machines, forging equipment, casting equipment, and other equipment that may be useful in operating the mining facility 10.

In certain embodiments, as previously noted, the mining facility 10 may also include one or more potentially hazardous areas 16. For example, the potentially hazardous areas 16 may include one or more confined spaces, one or more areas of high temperatures and pressures, gaseous areas, restricted areas of the mining facility 10, or any other area of the mining facility 10 the may be potentially hazardous to the personnel 22 within the mining facility 10. For example, as will be further appreciated, while supporting operations in one or more of the potentially hazardous or restricted areas of the mining facility 10, mining facility 10 personnel 22 (e.g., miners, engineers, field technicians, supervisors, contractors, etc.) may be susceptible to possible hazards including electromagnetic radiation (e.g., X-rays, gamma rays, etc.) exposure, nuclear radiation, potentially hazardous gas (e.g., CO emissions), dust, chemical, oxygen depleted spaces, fire, smoke, thermal energy and radiation, rotational energy and vibration, exposure to excessive temperatures (e.g., boiling or freezing temperatures), fatigue, alertness level, noise levels, exposure to low and high pressure environments, and so forth.

In certain embodiments, the industrial equipment 14 and the potentially hazardous areas 16 may include sensors 18 and communication beacons 20. The sensors 18 may include, for example, pressure sensors, temperature sensors, flow sensors, status and position indicators (e.g. limit switches, Hall effect switches, acoustic proximity switches, etc.), infrared sensors, radars, antennas (e.g., linear or phased-array), thermal radiation detectors, motion detectors, biosensors (e.g., biometric sensors), and a number of other sensors (e.g., wired and/or wireless) that may be used to detect human and/or mobile resource (e.g., mobile equipment, transportation equipment [trucks, automobiles, carts]) presence in one or more locations of the mining facility 10. In certain embodiments, the sensors 18 may pervade the mining facility 10, such that the presence of a human or other mobile resource may be detected and accounted for in all areas of the mining facility 10.

Similarly, the communication beacons 20 may include, for example, a Bluetooth® low energy (BLE) beacon, a radio frequency identification (RFID) tag, a subscriber identification module (SIM) card, or any of various active devices that may be used to communicate with an electronic hardhat 24 (e.g., protective helmet) worn by the personnel 22 (e.g., miners, engineers, field technicians, supervisors, contractors, etc.). Indeed, as will be discussed in further detail below, the communication beacons 20 may be placed on the industrial equipment 14 and/or around and about the potentially hazardous areas 16. In some embodiments, the communication beacons 20 may transmit one or more advertising packets with a unique transmitter identifier code (e.g., media control access [MAC] address). In one or more embodiments, the communication beacons 20 may include a magnet to attach easily to the industrial equipment 14 and/or around and about the potentially hazardous areas 16, or, in other embodiments, may include a Velcro® and/or epoxy backing to attach to the industrial equipment 14 and/or around and about the potentially hazardous areas 16.

Figure 2:
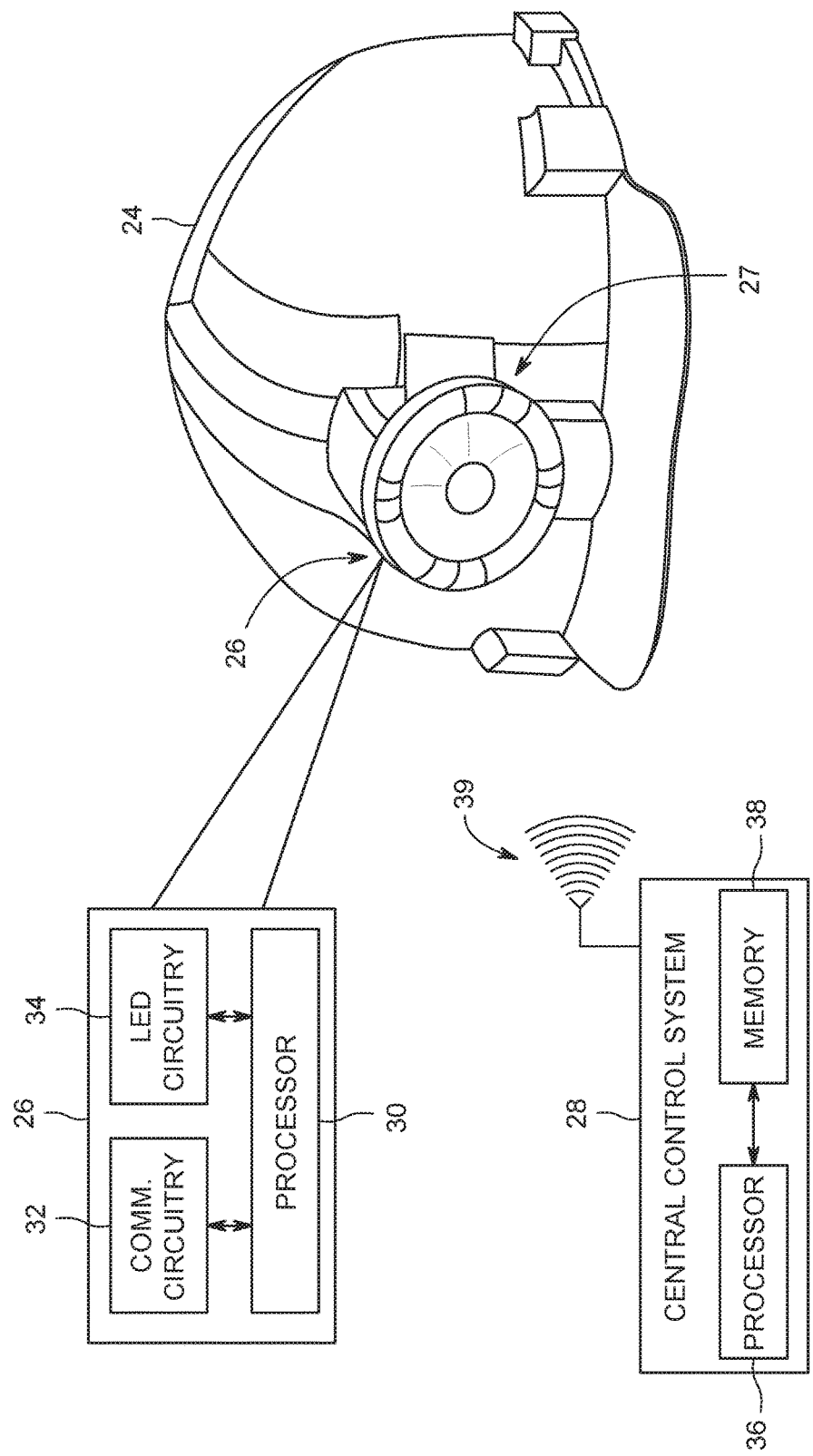
FIG. 2 is an illustration of a safety and proximity sensing hardhat and a central control system in accordance with present embodiments.

Turning now to FIG. 2, a detailed embodiment of the electronic hardhat 24 that may be worn by the personnel 22 (e.g., miners, engineers, field technicians, supervisors, contractors, etc.) as the personnel 22 maneuver in and about the mining facility 10 is depicted. For example, the electronic hardhat 24 may be worn by the personnel 22 throughout the time the personnel 22 are in and about the mining facility 10 as an additional safety protocol. In certain embodiments, as further depicted in FIG. 2, the electronic hardhat 24 may include an LED headlamp assembly 26 integrated into the electronic hardhat 24. The LED headlamp assembly 26 may allow the electronic hardhat 24 to communicate with the communication beacons 20 (e.g., attached to the industrial equipment 14 and/or around and about the potentially hazardous areas 16) and a central control system 28.

The LED headlamp assembly 26 may include a headlamp 27, a processor 30, communications circuitry 32, re-chargeable battery (e.g., Lithium-ion battery), an antenna and light-emitting diode (LED) driving and lighting circuitry 34. The processor 30 may be operatively coupled to a memory device to execute instructions for carrying out the presently disclosed techniques. These instructions may be encoded in programs or code stored in a tangible non-transitory computer-readable medium, such as a memory device of the LED headlamp assembly 26 and/or other storage. The processor 30 may be a general-purpose processor, system-on-chip (SoC) device, an application-specific integrated circuit (ASIC), or some other similar processor configuration.

In certain embodiments, as previously noted, the electronic hardhat 24 may also include the communications circuitry 32 and LED driving and lighting circuitry 34. The communications circuitry 32 may include any of various network interfaces such as, for example, interfaces for a personal area network (PAN), such as a Bluetooth® network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The communications circuitry 32 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), and so forth.

In certain embodiments, the LED driving and lighting circuitry 34 may include any device or any number of devices (e.g., LED driver circuitry) that may be useful in providing a source of power to, for example, a number of LED lighting devices (e.g., an LED lamp, an LED lighting system) and/or non-LED lighting device or system (e.g., a fluorescent lamp, a linear fluorescent lamp (LFL) system, a compact fluorescent (CFL) system, a halogen lamp, a high intensity discharge (HID) lamp, and so forth.

In certain embodiments, as previously noted, the electronic hardhat 24 may communicate with a central control system 28. The central control system 28 may also include processing circuitry, such as a processor 36 (e.g., general purpose processor or other processor) and a memory 38, that may be used, for example, to control (e.g., trip or temporarily shutdown) the industrial equipment 14 based on a received signal from the electronic hardhat 24. As further depicted, the central control system 28 may also include an antenna 39 useful for wireless communication with the electronic hardhat 24 and/or the communication beacons 20 (e.g., attached to the industrial equipment 14 and/or around or about the potentially hazardous areas 16).

Figure 3:
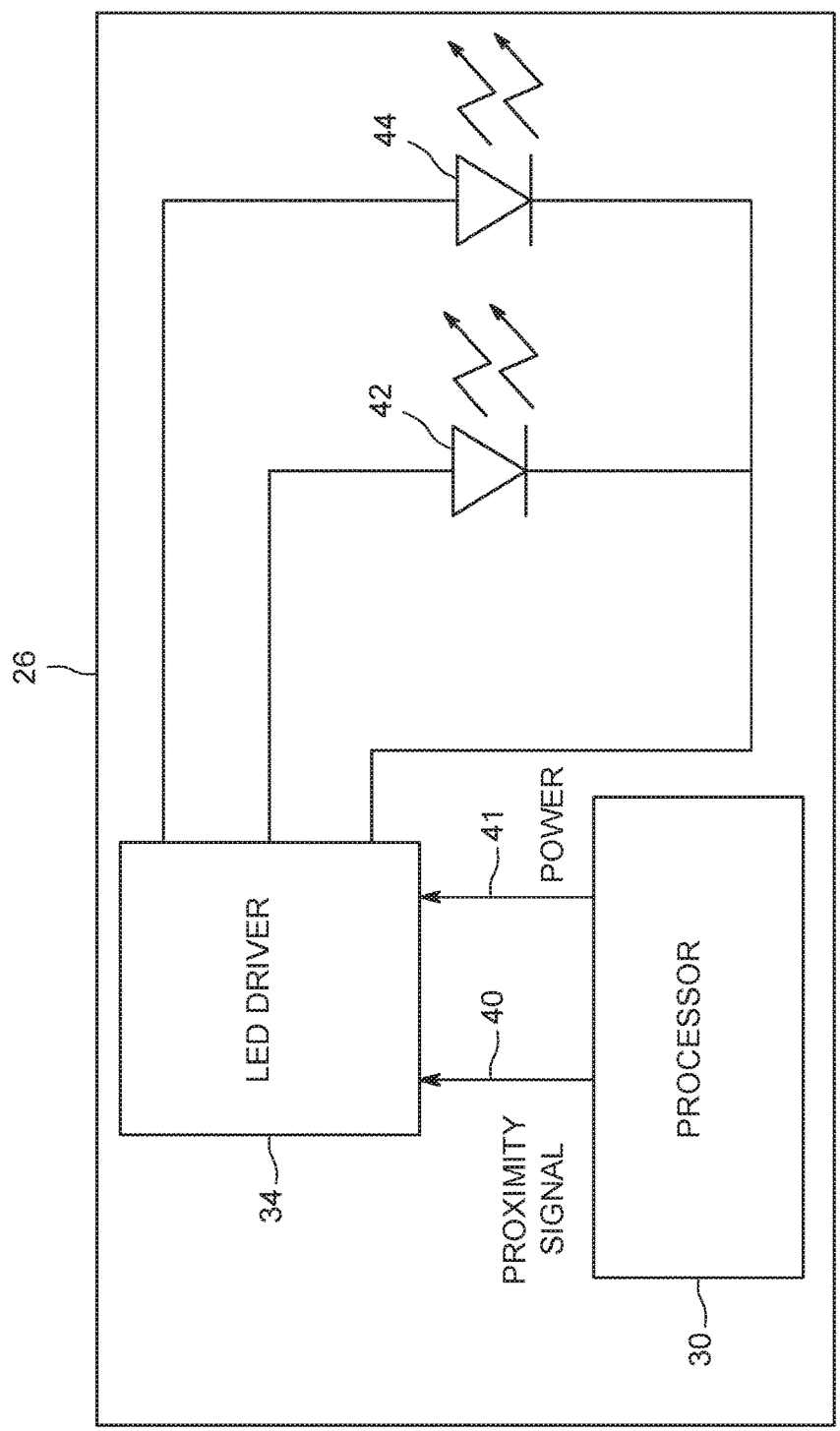
FIG. 3 illustrates an example of a light emitting diode (LED) headlamp assembly included as part of the safety and proximity sensing hardhat of FIG. 2, in accordance with an embodiment.

Turning now to FIG. 3, a detailed embodiment of the LED driving and lighting circuitry 34 is illustrated. As illustrated, the LED driving and lighting circuitry 34 may be integrated into the electronic hardhat 24. The processor 30 may monitor data transmission packets (BLE or other low energy data transmission packets) via a proximity signal 40, continuously. In some embodiments, when the processor 30 receives a data packet with a hazard beacon identification code (e.g., media access control [MAC] address) via the proximity signal 40 and determines that a received signal strength indication (RSSI) is above a threshold value (e.g., predetermined threshold value or a configurable threshold value), the processor 30 may determine that personnel 22 (e.g., miners, engineers, field technicians, supervisors, contractors, etc.) is currently nearby the industrial equipment 14 and/or hazardous areas 16. The processor 30 may then output a power signal 41 to generate alarms via LED devices 42 and 44.

In one embodiment, the processor 30 may generate a visual alarm, a haptic effect alarm, a vibration alarm, one or more sound alarms, a voice notification alarm, other alarm useful in alerting the personnel 22 of a potentially hazardous condition. For example, in one or more embodiments, the color emitted by the LED devices 42 and 44 (e.g., and by extension the color of the light emitted by the headlamp 27) may change, for example, from white to red. For example, the processor 30 may increase the current (e.g., via the power signal 41) to the LED device 44 to cause the electronic helmet 24 to emit a red light visual alarm indication as opposed to a nominal white light emitted by the LED device 42 under non-hazardous conditions. In another embodiment, the headlamp 27 may include red, green and blue light emitting diodes, which may each be energized to generate white light under normal conditions. However, when a hazardous condition is identified, the headlamp 27 may be energized such that red light is primarily generated. In another embodiment, the processor 30 may activate one or more vibration mechanisms of the electronic helmet 24 as an alarm indication.

In certain embodiments, as further depicted in FIG. 3, the LED devices 42 and 44 may each represent, for example, a group of the same LED devices 42 and 44 connected in series and/or a combination of series and parallel connections. For example, in one embodiment, the LED devices 42 and 44 may receive a current (e.g., via the power signal 41) supplied by a current regulator that may be included as part of the LED driving and lighting circuitry 34. In other embodiments, for example, in which the proximity signal 40 (e.g., hazard proximity signal) indicates a hazardous condition, power may be directed by use of power switches (e.g., field-effect transistors [FETs]) of the LED driving and lighting circuitry 34.

In such an embodiment, each power switch of the LED driving and lighting circuitry 34 may be turned "ON" (e.g., activated) one at a time to activate the LED devices 42 and 44 one at a time. In another embodiment, the processor 30 may supply a current (e.g., via the power signal 41) to the LED device 42, such the LED device 42 may emit white light continuously (e.g., while the personnel 22 is working within the mining facility 10). However, when the proximity signal 40 detected by the processor 30 indicates a hazardous condition, the processor 30 may provide an additional current (e.g., via the power signal 41) to the second LED device 44 to emit an emergency red light. In another embodiment, an additional warning LED device may be included on a field-of-view portion of the electronic hardhat 24. For example, the additional warning LED device may be placed on the rim of the electronic hardhat 24 (e.g., a few inches above the eye level of the personnel 22 wearing the electronic hardhat 24). In one embodiment, the additional warning LED device may be normally off, and may be activated only if there is a hazardous condition detected.

As previously noted, in one or more embodiments, the communication beacons 20 and/or the processor 30 may include one or more Bluetooth® devices. Indeed, as noted above with respect to FIG. 2, the communication beacons 20 may include one or more unique MAC addresses. In some embodiments, the MAC addresses of the communication beacons 20 may be programmable to operate in conjunction with the processor 30 to identify hazards to the personnel 22 associated with being in the proximity of the industrial equipment 14 and/or potentially hazardous areas 16. Similarly, additional electronic hardhats 24 may be added (e.g., corresponding to when additional personnel 22 enters into the proximity of the equipment 14 and/or the hazardous areas 16) by programming the MAC address of the communication beacons 20 with the electronic hardhats 24 and the central control system 28. For example, a table or list (e.g., stored on the memory 38 of the control system 28) of the control system 28 may be updated to add or delete certain electronic hardhats 24.

In some embodiments, if the processor 30 of the electronic hardhat 24 identifies a hazardous condition, the processor 30 may transmit advertising packets (e.g., Bluetooth® advertising packets) to, for example, the central control system 28 and/or to one or more of the communication beacons 20. In this embodiment, the communication beacons 20 may recognize the processor 30 of the electronic hardhat 24 that transmitted the noted advertising packets as an indication that personnel 22 may be in the proximity of the industrial equipment 14 and/or the potentially hazardous areas 16. The communication beacons 20 may then generate a signal to automatically shutdown or trip (e.g., cause the operation to temporarily cease) the industrial equipment 14.

In other embodiments, the processor 30 may transmit packets (e.g. Bluetooth® advertising packets) to the communication beacons 20, and, based on the RSSI, the central control system 28 may generate a map of the personnel 22 (e.g., miners, engineers, field technicians, supervisors, contractors, etc.) in the proximity of the industrial equipment 14 and/or hazard areas 16. The map generated by the central control system 28 may be presented, for example, to an operator to view and manually shutdown or trip the industrial equipment 14.

As a further example, as previously discussed, in certain embodiments, the LED headlamp assembly 26 and the communication beacons 20 may each include wireless transceiver circuitry, modules, or system-on-chip (SoC) devices that may be used to implement IEEE standardized communication protocols such as, for example, Bluetooth (IEEE 802.15.1), ZigBee (IEEE 802.15.4), WiFi (802.11), and so forth. The strength of a transmitted signal from the communication beacons 20 may decrease in a predictable manner as a function of distance from the communication beacons 20. As a result, the strength of the received signal strength at the LED headlamp assembly 26 may indicate the distance between the LED headlamp assembly 26 and the communication beacons 20. Indeed, if the signal strength is above a threshold, which indicates that the personnel 22 is in the proximately of a potentially hazardous area, an alarm is generated.

In other embodiments, the LED headlamp assembly 26 and the communication beacons 20 may include wireless transceiver circuits that may be used to implement ultra wide band (UWB) communication protocol IEEE 802.15.4-2011. In such an embodiment, the ultra-short time domain pulses used in this protocol may allow time of flight (TOF) estimation. Therefore, the distance between the LED headlamp assembly 26 and the communication beacons 20 may be estimated by measuring the time taken by a transmitted signal to propagate between the LED headlamp assembly 26 and the communication beacons 20. If the distance is below a pre-determined or configurable threshold, which indicates that the personnel 22 is in the proximately of a potentially hazardous area, an alarm is generated.

Thus, the present techniques described herein may provide a scalable and configurable system that may be useful in providing a warning to mining personnel 22 (e.g., miners, engineers, field technicians, supervisors, contractors, etc.) and/or other personnel working within other industrial environments when any of various potentially hazardous conditions (e.g., with respect to the personnel 22) are detected. Indeed, the present techniques described herein may increase safety in various industrial and/or commercial facilities and environments, Technical effects of the present embodiments relate to a scalable, configurable, lower cost proximity sensing system for safety and protection to personnel in mining environments and/or other industrial environments. The safety and proximity sensing system (e.g., electronic hardhat) may be useful in providing a warning to mining personnel (e.g., miners, engineers, field technicians, supervisors, contractors, etc.) in the proximity of hazardous areas (e.g., areas of radiation, potentially hazardous gas, high and low temperatures and pressures, chemical emissions, oxygen depleted spaces, fire, smoke, thermal energy and radiation, rotational energy and vibration, and so forth) and/or near industrial equipment (e.g., heavy-duty industrial equipment). In some embodiments, the safety and proximity sensing system may be scalable (e.g., easy to increase the number of mining personnel and corresponding electronic hardhats worn by the mining personnel) and configurable (e.g., able to identify single or multiple hazardous areas at once). In certain embodiments, the safety and proximity sensing system may warn the mining personnel via visual alarms (e.g., changing of the color of light-emitting diode [LED] headlamp of an electronic hardhat), a vibration alarm, and/or haptic effect alarms. In other embodiments, the safety and proximity sensing system may generate signals to automatically trip (e.g., temporarily disable) potentially hazardous industrial equipment (e.g. automatic mining machine, conveyer belt of launch vehicle) when a mining personnel enters into a designated hazardous area and/or nearby the potentially hazardous industrial equipment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A system, comprising:
a first electronic device configured to monitor an industrial machine or one or more areas of an industrial facility, wherein the first electronic device is configured to transmit a signal indicative of a potentially hazardous condition with respect to personnel of the industrial facility wherein the first electronic device is configured to transmit one or more Bluetooth® advertising packets as the signal indicative of the potentially hazardous condition; and
a second electronic device communicatively coupled to the first electronic device and configured to attach to a hardhat of the personnel of the industrial facility, wherein the second electronic device is configured to:
receive the signal from the first electronic device;
determine whether a parameter of the signal reaches a threshold; and
generate an alarm when the parameter of the signal is above the threshold, wherein the alarm is configured to indicate the potentially hazardous condition to the personnel.

2. The system of claim 1, wherein the first electronic device comprises a Bluetooth® low energy (BLE) beacon device, and wherein the second electronic device comprises a Bluetooth® low energy (BLE) receiver device.

3. The system of claim 1, wherein the second electronic device is configured to determine whether a received signal strength indicator (RSSI) is above the threshold as the parameter of the signal.

4. The system of claim 1, wherein the second electronic device is configured to generate the alarm by causing a light emitting diode (LED) device to change color.

5. The system of claim 4, wherein the second electronic device is configured to generate the alarm by causing the LED device to change from a white light to a red light.

6. The system of claim 4, wherein the LED device comprises an LED lamp, an LED lighting system, a plurality of LED devices, or a combination thereof.

7. The system of claim 1, wherein the industrial machine comprises an automatic mining machine, a launch vehicle, a conveyor belt of a launch vehicle, a storage vessel, a steam turbine, a gas turbine, a hydroelectric turbine, a generator, an expander, a compressor, a chemical reactor, a gasifier, a gas treatment system, an air separation unit (ASU), a boiler, a furnace, a water treatment system, a heat recovery steam generator (HRSG) system, or any combination thereof.

8. The system of claim 1, wherein the industrial facility comprises a mining industrial facility, a power generation industrial facility, a petroleum refinery industrial facility, a manufacturing facility, a building construction site, or a combination thereof.

9. A system, comprising:
a first electronic device configured to monitor an industrial machine or one or more areas of an industrial facility, wherein the first electronic device is configured to transmit a signal indicative of a potentially hazardous condition with respect to personnel of the industrial facility; and
a second electronic device communicatively coupled to the first electronic device and configured to attach to a hardhat of the personnel of the industrial facility, wherein the second electronic device is configured to:
receive the signal from the first electronic device;
determine whether a parameter of the signal reaches a threshold; and
generate an alarm when the parameter of the signal is above the threshold, wherein the alarm is configured to indicate the potentially hazardous condition to the personnel,
wherein the first electronic device and the second electronic device each comprises an ultra wide band communication circuit, and wherein the second electronic device is configured to determine whether a time of flight (TOF) is below the threshold as the parameter of the signal.

10. A system, comprising:
a first electronic device configured to monitor an industrial machine or one or more areas of an industrial facility, wherein the first electronic device is configured to transmit a signal indicative of a potentially hazardous condition with respect to personnel of the industrial facility personnel, wherein the first electronic device is configured to transmit a signal indicative of the potentially hazardous condition based at least in part on a media access code (MAC) address; and
a second electronic device communicatively coupled to the first electronic device and configured to attach to a hardhat of the personnel of the industrial facility, wherein the second electronic device is configured to:
receive the signal from the first electronic device;
determine whether a parameter of the signal reaches a threshold; and
generate an alarm when the parameter of the signal is above the threshold, wherein the alarm is configured to indicate the potentially hazardous condition to the personnel.

11. A non-transitory computer-readable medium having computer executable code stored thereon, the code comprising instructions to:
cause a processor to receive a signal from a first electronic device, wherein the signal comprises an indication of a potentially hazardous condition with respect to personnel of an industrial facility;
cause the processor to determine whether a parameter of the signal is above a threshold; and
cause the processor generate an alarm when the parameter of the signal is above the threshold, wherein the alarm is configured to indicate the potentially hazardous condition to the personnel, wherein the code comprises instructions to cause the processor to receive one or more Bluetooth® advertising packets as the signal indicative of the potentially hazardous condition.

12. The non-transitory computer-readable medium of claim 11, wherein the code comprises instructions to cause the processor to determine whether a received signal strength indicator (RSSI) is above the threshold as the parameter of the signal.

13. The non-transitory computer-readable medium of claim 11, wherein the code comprises instructions to cause the processor to generate the alarm by causing a light emitting diode (LED) device to change from a white light to a red light.

14. The non-transitory computer-readable medium of claim 11, wherein the code comprises instructions to cause the processor to transmit a signal comprising a command to temporarily disable one or more industrial machines within the industrial facility when the parameter of the signal is above the threshold.

15. A non-transitory computer-readable medium having computer executable code stored thereon, the code comprising instructions to:
cause a processor to receive a signal from a first electronic device, wherein the signal comprises an indication of a potentially hazardous condition with respect to personnel of an industrial facility;
cause the processor to determine whether a parameter of the signal is above a threshold; and
cause the processor generate an alarm when the parameter of the signal is above the threshold, wherein the alarm is configured to indicate the potentially hazardous condition to the personnel,
wherein the code comprises instructions to cause the processor to determine whether the parameter of the signal is above the threshold based at least in part on a media access code (MAC) address associated with the signal.

16. A system, comprising:
a hardhat, comprising:
  a light emitting diode (LED) headlamp assembly, comprising:
    a processor configured to:
      receive a first signal comprising advertising packets, wherein the advertising packets comprise one or more unique identification codes configured to indicate a potentially hazardous condition with respect to personnel of an industrial facility;
      determine whether a signal strength indicator (RSSI) of the first signal is above a threshold value; and
      generate an alarm when the RSSI of the signal is above the threshold value, wherein the alarm is configured to indicate the potentially hazardous condition to the personnel.

17. The system of claim 16, wherein the processor is configured to generate the alarm by causing the LED headlamp to change from a white light to a red light to indicate the potentially hazardous condition.

18. The system of claim 16, wherein the processor is configured to generate the alarm by causing one or more components of the hardhat to vibrate to indicate the potentially hazardous condition.

* * * * *